United States Patent
May

(10) Patent No.: US 6,761,310 B2
(45) Date of Patent: Jul. 13, 2004

(54) CARD READER

(75) Inventor: David C. C. May, Fife (GB)

(73) Assignee: NCR Corporation, Dayton, OH (US)

( * ) Notice: Subject to any disclaimer, the term of this patent is extended or adjusted under 35 U.S.C. 154(b) by 88 days.

(21) Appl. No.: 10/143,677

(22) Filed: May 10, 2002

(65) Prior Publication Data

US 2002/0170957 A1 Nov. 21, 2002

(30) Foreign Application Priority Data

May 16, 2001 (GB) .............................................. 0111989

(51) Int. Cl.[7] .................................................. G06K 5/00
(52) U.S. Cl. ....................................... 235/380; 235/383
(58) Field of Search .................................. 215/376, 415

(56) References Cited

U.S. PATENT DOCUMENTS

| 4,904,852 A | 2/1990 | Mita et al. |
| 5,557,089 A | 9/1996 | Hall et al. |
| 6,527,187 B1 * | 3/2003 | Nagata et al. ............... 235/415 |

FOREIGN PATENT DOCUMENTS

| EP | 0 274 684 A1 | 7/1988 |
| EP | 0 293 888 A2 | 12/1988 |
| FR | 2 552 252 A1 | 3/1985 |
| NL | 1007956 | 8/1999 |

* cited by examiner

Primary Examiner—Harold I. Pitts
(74) Attorney, Agent, or Firm—Michael Chan

(57) ABSTRACT

A card reader (10), and particularly a manual insertion hybrid dip card reader, is described. The card reader (10) comprises a magnetic read head (28) for reading a magnetic stripe (62) on a card (60), and an integrated circuit interface (42) for reading terminals (64) on an integrated circuit card (60). The interface (42) is mounted on a moveable carrier (40) for moving relative to the magnetic read head (28) while the interface (42) is coupled to the card terminals (64). The carrier (40) may be biased towards an entrance of the card reader (10), and may be nearer the entrance than the magnetic read head (28). A self-service terminal including such a card reader is also described.

13 Claims, 3 Drawing Sheets

CARD READER

BACKGROUND OF THE INVENTION

The present invention relates to a card reader, and particularly to a manual insertion hybrid dip card reader.

A hybrid card reader is a card reader that can read a magnetic stripe card, a smart card (also referred to as an integrated circuit card), and a combined magnetic stripe and smart card. To read a magnetic stripe, the stripe must move relative to a magnetic read head; however, to read a smart card having conducting terminals, the card terminals must align, make contact, and remain in contact with terminals used for reading the smart card.

A dip card reader is a reader that does not have any transport mechanism for automatically transporting a card (unlike a motorized card reader/writer module), but a dip reader does receive and support an inserted card (unlike a swipe card reader). To use a dip reader, a user must manually insert his/her card, typically short edge first, and then manually remove the card.

A hybrid dip card reader typically comprises a housing having a guide portion extending therefrom. The guide portion is generally u-shaped, defines recesses for receiving opposite long edges of a card, and includes a magnetic read head. The housing contains pivoting read/write smart card terminals that are lowered by a leading edge of an inserted card so that when the card has been fully inserted the read/write terminals align with and contact the card terminals on the card.

Hybrid dip card readers are used in apparatus, such as an automated teller machine (ATM), where a user may insert a magnetic stripe card, a smart card, or a combined magnetic stripe and smart card to conduct a transaction.

If a magnetic card is used, then the user typically inserts and then immediately removes the card to initiate a transaction. However, if a combined magnetic and smart card is used, then the dip reader locks the card in the reader using a pin shutter.

One disadvantage of such a hybrid dip reader is that when a user's card engages with the pivoting terminals, the card slows down due to the force required to move the pivoting terminals. This change in speed of the card reduces the possibility of the magnetic read head from accurately reading the magnetic stripe on the card. For this reason, in some applications a magnetic stripe card is read on removal rather than on insertion.

Another disadvantage of such an arrangement is that a user may not know whether he/she has to insert and remove the card, or insert and leave the card in place. If a user inserts a card and attempts to withdraw it immediately, but the dip reader locks the card, then the user may experience an unpleasant jarring sensation, which may also damage the card and/or the card reader. This may reduce the usability of the card reader and may discourage users from using the card reader again.

SUMMARY OF THE INVENTION

It is among the objects of an embodiment of the present invention to obviate or mitigate one or more of the above disadvantages or other disadvantages associated with card readers.

According to a first aspect of the present invention there is provided a card reader comprising a magnetic read head for reading a magnetic stripe, and an integrated circuit interface for reading terminals on an integrated circuit card, characterized in that the interface is mounted on a moveable carrier for moving relative to the magnetic read head while the interface is coupled to the card terminals.

By virtue of this aspect of the invention the card reader interface is able to read data from the card terminals while the card is being inserted and moving relative to the magnetic read head.

If the interface is coupled to the card at the beginning of the insertion sequence, then there is no change in force required to insert the card fully. As there is no change in force required, the probability of a card being inserted at a constant rate is increased. This increases the probability of the magnetic read head being able to read a magnetic stripe accurately. This also allows the card reader to determine if the card has any terminals prior to the card being fully inserted rather than after the card has been fully inserted.

Preferably, the carrier is biased towards an entrance of the card reader, so that an inserted card engages with the interface at the start of the insertion sequence. In preferred embodiments, the carrier is biased nearer the entrance than the magnetic read head so that the interface is in contact with the card terminals prior to a magnetic stripe on the card passing over the magnetic read head.

Preferably, the interface is pivotably mounted on the carrier. Preferably, the interface co-operates with a surface of the card reader so that as a leading edge of an integrated circuit card is inserted the interface is lowered into contact with terminals on the card.

Preferably, the card reader includes a shutter for locking an inserted card within the card reader.

Preferably, the shutter is resiliently mounted to the card reader so that the shutter allows some movement of a trapped card. This provides an improved user interface as it avoids the jarring effect of a user attempting to remove a card that has been locked by the shutter.

According to a second aspect of the invention there is provided a self-service terminal (SST) incorporating a card reader according to the first aspect of the invention.

The SST may be an automated teller machine (ATM). Alternatively, the SST may be a retail point of sale (PoS) terminal.

BRIEF DESCRIPTION OF THE DRAWINGS

These and other aspects of the present invention will be apparent from the following specific description, given by way of example, with reference to the accompanying drawings, in which.

DETAILED DESCRIPTION

Figure 1:
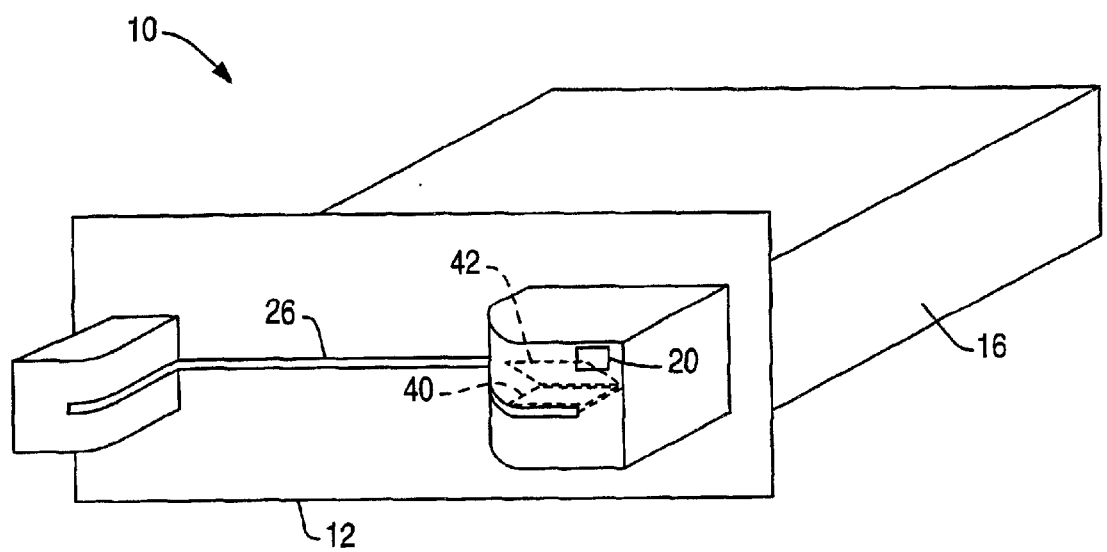
FIG. 1 is a schematic perspective view of a card reader according to one embodiment of the invention.
Figure 2:
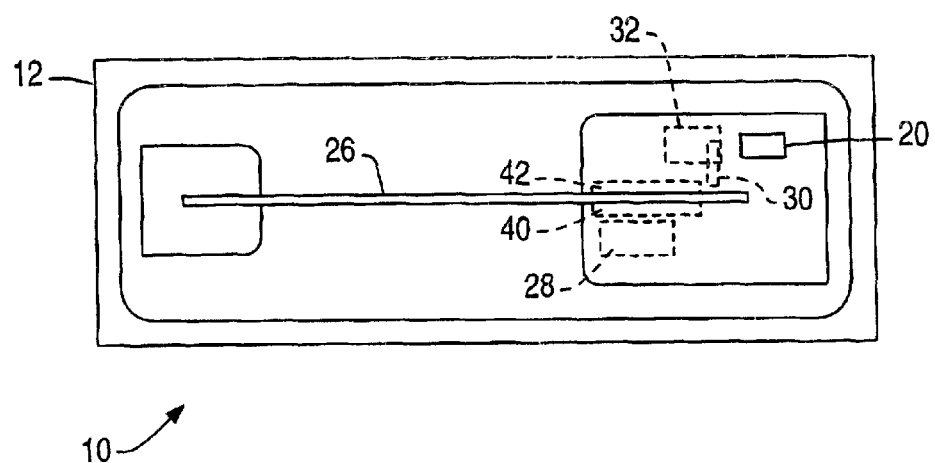
FIG. 2 is a schematic front view of the card reader of FIG. 1.
Figure 3:
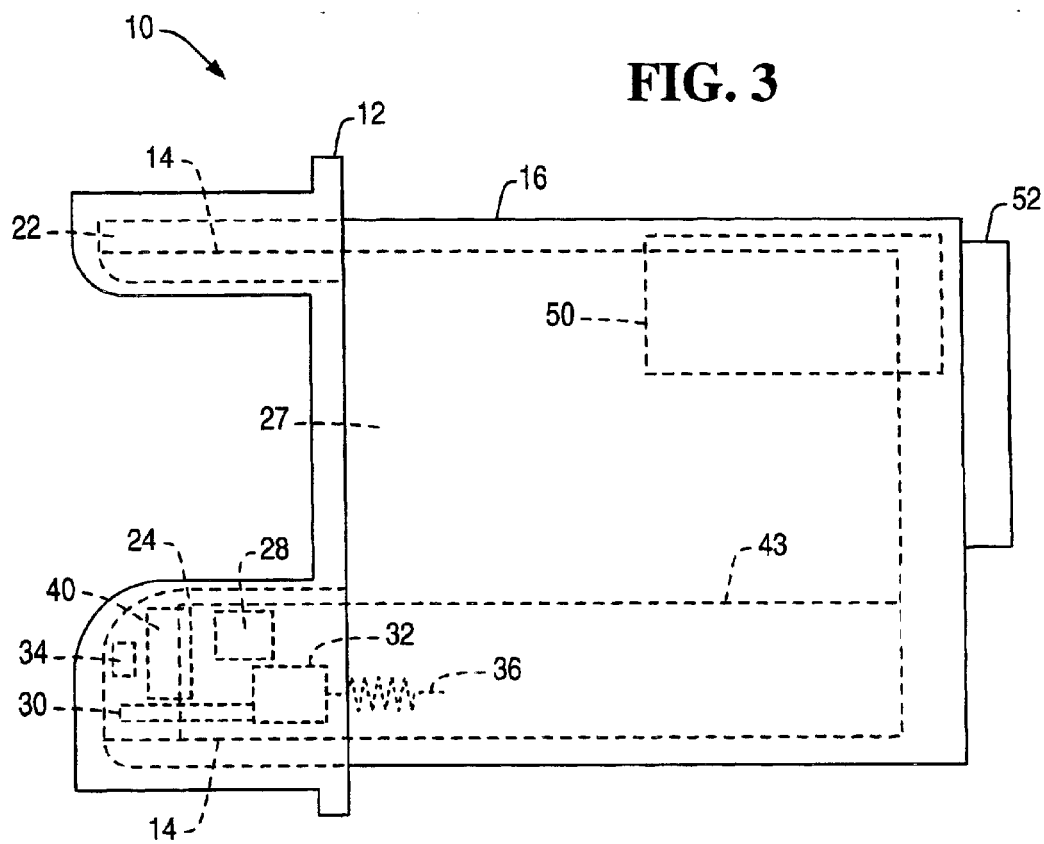
FIG. 3 is a schematic plan view of the card reader of FIG. 1.

Reference is now made to FIGS. 1 to 3, which show a manual insertion hybrid dip card reader 10 according to one embodiment of the present invention. The card reader 10 comprises a bezel 12 covering a guide portion 14 extending from a housing portion 16.

The bezel 12 includes a transparent cover 20 that aligns with an LED (not shown) in the guide portion 14.

The guide portion 14 has two arms 22,24; each arm 22,24 defines a slot that aligns with part of a continuous slot 26 in the bezel 12 for guiding an inserted card through the bezel 12 and guide portion 14, and into a card chamber 27 in the card reader housing portion 16.

Arm 22 is narrower than arm 24 and serves only to guide a card during insertion and removal. Arm 24, however, is wider than arm 22 and includes: a magnetic read head 28 for reading a magnetic stripe on a card; a pin shutter 30 for locking a card within the reader 10; a solenoid 32 for activating the pin shutter 30; and a card sensor 34 for sensing the presence of a card. The solenoid 32 is mounted to the housing portion 16 by a resilient member 36 in the form of a coil spring.

The arm 24 also includes a manually actuated movable carrier 40 having an integrated circuit (smart card) interface 42 for reading terminals on a smart card. The carrier 40, which moves within an enclosure 43, will be described in more detail below.

Figure 4:
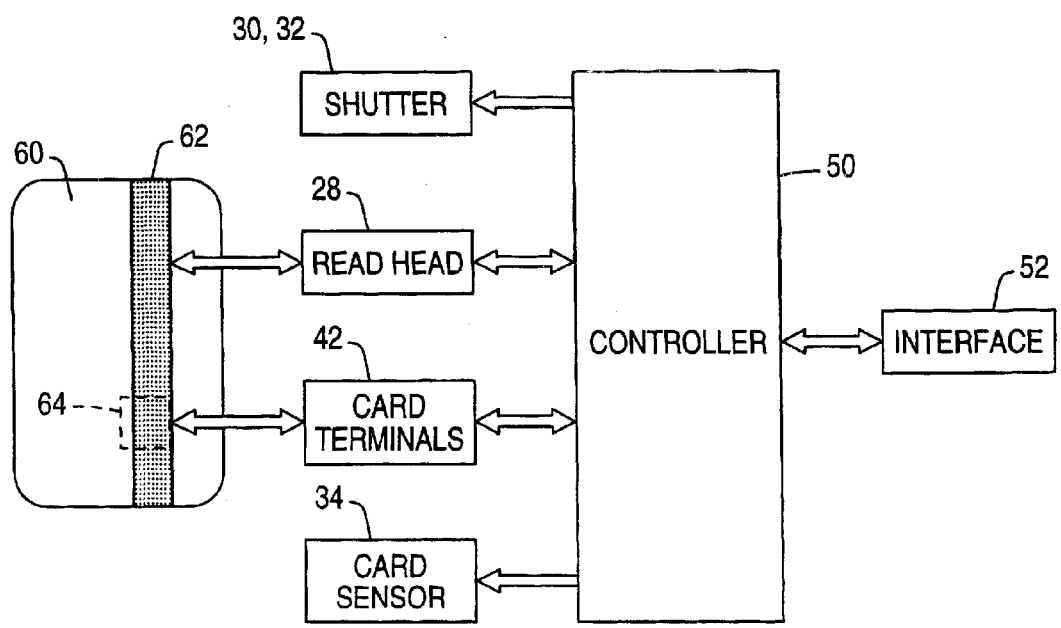
FIG. 4 is a block diagram of the card reader of FIG. 1 interfacing with a card.

The housing portion 16 incorporates a controller 50, as illustrated in FIG. 4, for controlling the operation of the card reader 10. The controller 50 is coupled to a communications interface 52, in addition to being coupled to the shutter mechanism (including the pin shutter 30 and solenoid 32), the magnetic read head 28, the smart card interface 42, and the card sensor 34.

FIG. 4 also illustrates a hybrid card 60 having a magnetic stripe 62 and integrated circuit terminals 64 located on an opposite side of the card 60 to the magnetic stripe 62.

Figure 5A:
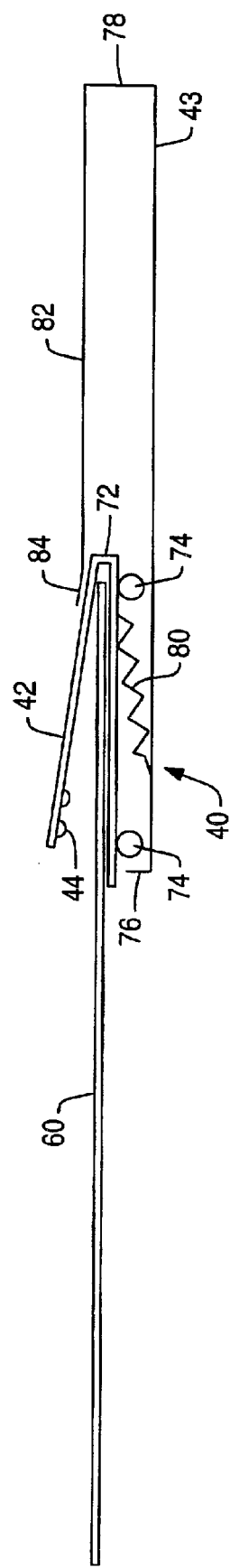
FIG. 5a is a schematic section view of part of the card reader of FIG. 1 having a card partially inserted therein.

The movable carrier 40 will now be described with reference to FIGS. 5a and 5b, which are simplified schematic diagrams of the card 60 engaging with the carrier 40 located in the card enclosure 43.

The carrier 40 comprises the smart card interface 42 pivotably mounted to a chassis 72. The interface 42 includes reading terminals 44 and the chassis 72 includes two rollers 74 located within tracks (not shown) for enabling the carrier 40 to move smoothly from an entrance end 76 of the enclosure 43 to an opposite (stop) end 78 of the enclosure 43.

The carrier 40 is coupled to the enclosure 43 by a resilient member 80 in the form of a light coil spring for urging the carrier 40 to the entrance end 76 so that part of the carrier 40 protrudes through the entrance end 76 for engaging with a card. The coil spring 80 applies only a very small force to the carrier 40, so that a user does not notice the force imparted by the spring 80 when the card 60 is inserted or removed.

The enclosure 43 includes an upper surface 82 defining a lip 84 that co-operates with the pivotable interface 42, so that as the carrier moves towards the stop end 78, the interface 42 is urged downwards until the reading terminals 44 contact the terminals 64 on the card 60.

Figure 5B:
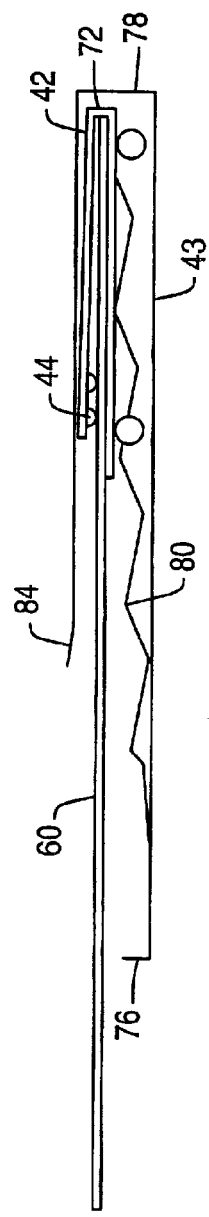
FIG. 5b is a schematic section view of part of the card reader of FIG. 1 having a card fully inserted therein.

FIG. 5b illustrates the card 60 when it has been fully inserted into the enclosure 43.

As the card interface 42 is in contact with the card terminals 64 prior to the card reaching the stop end 78, the controller 50 can determine if the card 60 includes any terminals 64, and can convey this information to an application controlling the card reader 10. Thus, if the card reader is used in an ATM that offers additional services to card holders having a smart card, then the ATM can determine whether to offer the additional services prior to the card being fully inserted.

If the card 60 is a smart card, then the card reader 10 activates the shutter 30 via the solenoid 32 to ensure that the card 60 is not removed by the user until a transaction has been completed. By determining that the card is a smart card as the card is being inserted, the card reader 10 is able to activate the shutter 30 prior to completion of the insertion sequence.

If a user attempts to remove the card 60 after activation of the shutter 30, then the user will feel damped resistance when attempting to remove the card because of coil spring 36 exerting a relatively strong force.

It will now be appreciated that by locating the magnetic read head 28 rearwardly of the movable carrier 40, the integrated circuit interface 42 pivotably mounted to the carrier 40 engages with terminals on the card 60 prior to the magnetic stripe on the card 60 passing over the magnetic read head 28.

Various modifications may be made to the above described embodiments within the scope of the invention, for example, in other embodiments, the movable carrier may be conveyed using a different mechanism than that described, for example, a sliding mechanism may be used instead of a rolling mechanism. It will be appreciated that the card reader may be a card reader and writer.

What is claimed is:

1. A card reader comprising:
   a magnetic read head for reading a magnetic stripe disposed on a card;
   a chassis movable between an uninserted position and an inserted position relative to the magnetic read head such that the magnetic read head can read a magnetic stripe disposed on a card carried by the chassis when the chassis moves from one of the positions to the other one of the positions;
   an integrated circuit interface including terminals for reading terminals disposed on a card carried by the chassis; and
   means for pivotably connecting the chassis and the interface such that the interface terminals and terminals of a card carried by the chassis pivot away from each other when the chassis is moved to the uninserted position and pivot into contact with each other when the chassis is moved to the inserted position.

2. A card reader comprising:
   a magnetic read head for reading a magnetic stripe;
   a chassis movable relative to the magnetic read head between an uninserted position in which a card can be placed in the chassis and an inserted position; and
   an integrated circuit interface pivotably mounted on the chassis such that the interface is pivotably moved into contact with terminals of an integrated circuit card as the chassis is moved from the uninserted position to the inserted position.

3. A card reader according to claim 2, further comprising (i) means defining an entrance and (ii) means for biasing the chassis towards the entrance such that the interface is pivoted away from the chassis to allow a card to be inserted therebetween.

4. A card reader according to claim 3, wherein the chassis is biased nearer the entrance than the magnetic read head.

5. A card reader according to claim 2, further comprising a shutter for locking a card within the card reader when the chassis is in the inserted position.

6. A card reader according to claim 5, further comprising a resilient member coupled to the shutter for allowing some movement of the locked card to avoid a jarring effect on a user attempting to remove the locked card.

7. A method of operating a card reader, the method comprising:

receiving a leading edge of an integrated circuit card having a number of terminals and a magnetic stripe;

moving an interface into contact with the terminals when the leading edge of the card is received and moving in a forward direction;

reading the terminals when the interface moves into contact therewith; and reading the magnetic stripe when the leading edge of the card is moving and the terminals are being read.

8. A self-service terminal comprising:

a magnetic read head for reading a magnetic stripe disposed on a card;

a chassis movable between an uninserted position and an inserted position relative to the magnetic read head such that the magnetic read head can read a magnetic stripe disposed on a card carried by the chassis when the chassis moves from one of the positions to the other one of the positions;

an integrated circuit interface including terminals for reading terminals disposed on a card carried by the chassis; and means for pivotably connecting the chassis and the interface such that the interface terminals and terminals of a card carried by the chassis pivot away from each other when the chassis is moved to the uninserted position and pivot into contact with each other when the chassis is moved to the inserted position.

9. An automated teller machine (ATM) comprising:

a magnetic read head for reading a magnetic stripe on an ATM card;

a chassis movable relative to the magnetic read head between an uninserted position and an inserted position; and an integrated circuit interface pivotably mounted on the chassis such that in the uninserted position an ATM customer can place the ATM card between the chassis and the interface, and in the inserted position the interface is in contact with the ATM card, the interface being pivotably moved into contact with the ATM card as the chassis is moved from the uninserted position to the inserted position.

10. An ATM according to claim 9, further comprising (i) means defining an entrance and (ii) means for biasing the chassis towards the entrance such that the interface is pivoted away from the chassis to allow an ATM card to be inserted therebetween.

11. An ATM according to claim 10, wherein the chassis is biased nearer the entrance than the magnetic read head.

12. An ATM according to claim 9, further comprising a shutter for locking the ATM card in the inserted position.

13. An ATM according to claim 12, further comprising a resilient member coupled to the shutter for allowing some movement of the locked ATM card to avoid a jarring effect on an ATM customer attempting to remove the locked ATM card.

* * * * *